UNITED STATES PATENT OFFICE.

EUGEN BÖRNER, OF OFFENBURG, GERMANY.

FRESCO-PAINTING AND COLORED WEATHERPROOF ARCHITECTURAL ORNAMENT.

1,044,859.

Specification of Letters Patent.   Patented Nov. 19, 1912.

No Drawing.   Application filed January 9, 1911.   Serial No. 601,727.

*To all whom it may concern:*

Be it known that I, EUGEN BÖRNER, a subject of the Emperor of Germany, residing at Offenburg, in the German Empire, have invented a new and useful Process for the Production of Fresco-Paintings and Colored Weatherproof Architectural Ornaments; and I do hereby declare that the following is a full, clear, and exact description of the invention, which will enable others skilled in the art to which it appertains to make and use the same.

This invention relates to a process for the production of fresco-paintings and colored weather-proof architectural ornaments.

A process is known by which glass mosaics are produced by burning in pieces of glass at a high temperature on cement masses. This process has the disadvantage that the mosaics leaving the oven or furnace possess only a slight degree of strength or rigidity and must be stored for a considerable time before they can be used, in order that a renewed binding of the cement may take place; they nevertheless, remain very fragile, and as, moreover, the requirement that the glass pieces shall be fast cemented in, necessitates a high burning temperature, the employment of the process for decorative purposes is limited.

Now, I have discovered a new process by which not only are the above described defects obviated but also the manufacture is simplified and an artistic ornamentation and effect rendered possible. To this end in lieu of employing pieces of glass I make use of ceramic and glass colors whereby I am enabled to prepare fresco-paintings; also instead of a concrete mass of cement and sandy admixtures, I utilize a cement mixture in which flux-like additions, for example, feldspar, granite, basalt, ground glass and similar naturally or artificially slagging substances can be made use of. The mixture is then made into articles of the form and size desired and allowed to "set". Suitable fluxes and colors are then painted upon the said mass of cement and admixtures. The painting may be applied to the articles before "setting" but it is generally preferable to apply it thereafter as the articles can be more conveniently handled. The goods are then introduced into an oven or furnace and only require burning at a moderate heat. The relatively easily fusible substances cake with the cement and the whole mass combines with the colors applied to it so as to form a solid mass. As, moreover, the main part or body of the article is quite porous, it absorbs more or less of the colors and after the firing the design will have a less glittering appearance than it otherwise would. It is true that the main body or base does not absorb the colors equally but usually a sufficient amount of the surface colors are absorbed to effect the result stated. The rough surface of itself aids in producing this effect and where the colors are not so fully absorbed relieves such parts from the glittering appearance that would otherwise be produced. They are distinguished from ordinary glazed clay goods by their softer appearance and the reduced amount of light reflected. They differ from these also advantageously by the hardening qualities of the raw mass. The articles or goods of cement and admixtures can be thin and of complicated shape without any risk of fracture during the painting process. Furthermore, they possess the extreme advantage of not shrinking under heat or in any event of exhibiting practically no shrinkage as compared with clay goods. There are, therefore, no rejections due to unequal contraction or warping, no splitting occurs, and fitted pieces exactly fit after firing. It, therefore, becomes unnecessary to trim or finish the goods after the firing or burning operation.

It will be obvious that sand and quartz can be admixed with the fusible admixtures to the cement without in any way modifying the process herein described.

Claim:

A method of producing fresco paintings and colored weather proof architectural ornaments consisting in forming a plastic composition of cement and flux like additions, shaping or molding an article of the form desired, then painting the article with paint containing in addition to coloring matter, materials that will flux with the materials of the base, and then burn the whole at a moderate heat.

EUGEN BÖRNER

Witnesses:
AUGUST OOSTERMAN,
MARIA HEITTIG.